(12) United States Patent
Spö rrer

(10) Patent No.: US 7,472,539 B2
(45) Date of Patent: Jan. 6, 2009

(54) CHAIN HAVING A PLURALITY OF CHAIN LINKS

(75) Inventor: Joachim Spö rrer, Erlangen (DE)

(73) Assignee: Schaeffler KG, Herzogenaurach (DE)

( * ) Notice: Subject to any disclaimer, the term of this patent is extended or adjusted under 35 U.S.C. 154(b) by 0 days.

(21) Appl. No.: 11/880,095

(22) Filed: Jul. 18, 2007

(65) Prior Publication Data

US 2008/0041031 A1 Feb. 21, 2008

Related U.S. Application Data

(60) Provisional application No. 60/835,845, filed on Aug. 4, 2006.

(30) Foreign Application Priority Data

Jul. 21, 2006 (DE) ........................ 10 2006 033 730

(51) Int. Cl.
*F16G 13/04* (2006.01)

(52) U.S. Cl. .................... 59/8; 59/4; 59/5; 474/212; 474/213

(58) Field of Classification Search ................. 474/206, 474/212, 213, 217; 59/4, 5, 35.1, 78
See application file for complete search history.

(56) References Cited

U.S. PATENT DOCUMENTS

| | | | |
|---|---|---|---|
| 6,450,911 B2 * | 9/2002 | Saitou | 474/213 |
| 6,743,134 B2 * | 6/2004 | Okabe et al. | 474/213 |
| 7,325,391 B1 * | 2/2008 | Oishi et al. | 59/5 |
| 2002/0123404 A1 | 9/2002 | Okabe | 474/212 |
| 2003/0181274 A1 | 9/2003 | Albertin et al. | 474/214 |

FOREIGN PATENT DOCUMENTS

DE 102 09 704 A1 9/2002

* cited by examiner

*Primary Examiner*—David B Jones
(74) *Attorney, Agent, or Firm*—Alfred J. Mangels

(57) ABSTRACT

A link plate for a plate-link chain that is composed of a plurality of chain links that include link plates, wherein adjacent chain links are hingedly connected with each other by connectors received in openings of the link plates. The link plate is a plate member having a predetermined thickness and a pair of spaced openings. Web regions between an outer edge section of the plate and an adjacent plate opening have a width that is less than about 0.8 times the predetermined thickness of the plate member.

6 Claims, 1 Drawing Sheet

CHAIN HAVING A PLURALITY OF CHAIN LINKS

BACKGROUND OF THE INVENTION

1. Field of the Invention

The present invention relates to a chain having a plurality of chain links which include link plates, wherein adjacent chain links are hingedly connected with each other by means of chain pins and/or chain sleeves held in corresponding openings of the link plates, and wherein a web region is formed between an outer edge section and an associated opening of each link plate.

2. Description of the Related Art

Variously constructed chains are known from the existing art. Normally, each chain includes a large number of chain links, which are hingedly connected with each other by means of chain pins or chain sleeves. To that end, the chain links include a plurality of link plates, situated approximately parallel to each other. Each link plate can have two openings, for example, for receiving the respective chain pins or chain sleeves. The openings are normally in the shape of circles.

On the known chains, web regions are formed between an outer edge section and an associated opening of each link plate. The width of those web regions is chosen to be approximately twice as great as the material thickness of the link plate. That results in relatively poor utilization of material when stamping the link plates, so that it has a negative effect on the manufacturing costs of the known chains. Furthermore, because of the relatively large width of the web regions, the region available for the diameter of the chain pins or chain sleeves is also significantly limited, so that only rather small chain pin or chain sleeve diameters are possible.

An object of the present invention is to provide a chain of the type described above, with which optimal material utilization is achieved for the link plates and the manufacturing costs are reduced.

SUMMARY OF THE INVENTION

The object is achieved with the present invention by a chain having a plurality of chain links that include link plates, wherein adjacent chain links are hingedly connected with each other by means of chain pins, and/or chain sleeves held in corresponding openings of the link plates. A web region is provided between an outer edge section and an associated opening of each link plate. The width of the respective web region between the outer edge section and an associated opening is less than 0.8 times the thickness of the link plate material thickness.

Because the web width of the link plates is significantly reduced in relation to the material thickness of the link plates, optimal material utilization can be realized in the chain links of the chain in accordance with the invention. It has been found with the present invention that chains with web regions on the link plates that have the indicated web width are both especially economical because of optimal material utilization and also adequately fulfill the requirements with regard to mechanical strength.

Another particular advantage of the chain in accordance with the present invention results from the fact that because of the small width of the respective web region of the link plate the diameter of the chain pin and/or chain sleeve used can be enlarged accordingly. As a result, it is also certainly possible to use chain pins or chain sleeves with larger diameters in the chain in accordance with the invention. Because of the use of larger diameters for the chain pins or chain sleeves, an enlargement of the articulation surfaces of the chain link plates can be achieved, whereby the wear performance of the chain in accordance with the present invention is improved.

One possible embodiment of the present invention can provide, for example, that a somewhat elongated form of the link plates with rounded ends is provided in the chain, there being an opening provided at each end of the link plate so that web regions are provided between the outer edge sections at the ends of the link plate and the respective associated openings. Preferably, approximately circular openings can be provided for receiving the chain pins or chain sleeves.

In accordance with a preferred embodiment of the invention, approximately semicircular web regions with the indicated width can be provided on the link plates at each end of the elongated link plate. Other shapes are also possible.

In another embodiment of the invention the proposed chain can be a toothed chain. In a toothed chain, web regions with the indicated width are preferably provided on the link plates between the outer and inner flanks on a long side and the respective corresponding openings.

BRIEF DESCRIPTION OF THE DRAWINGS

The structure, operation, and advantages of the present invention will become further apparent upon consideration of the following description, taken in conjunction with the accompanying drawings in which.

DESCRIPTION OF THE PREFERRED EMBODIMENTS

Figure 1:
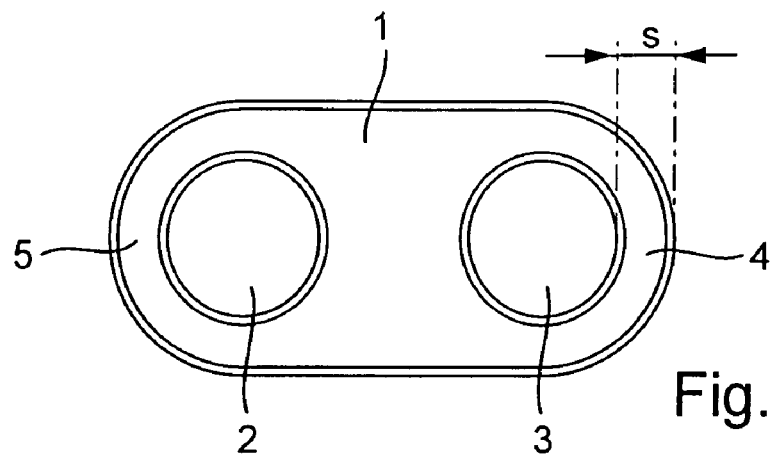
FIG. 1 is a side view of a first possible embodiment of a chain link plate in accordance with the present invention.
Figure 2:
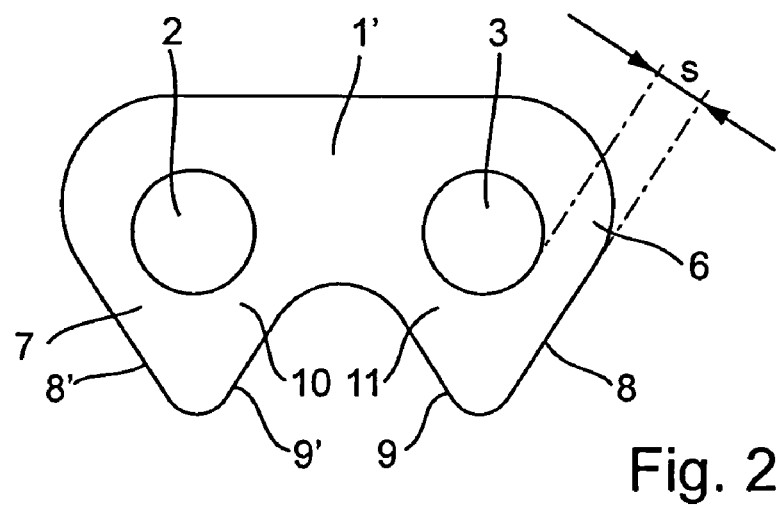
FIG. 2 is a side view of a second possible embodiment of a chain link plate in accordance with the present invention for a toothed chain.

FIG. 1 shows a first embodiment of a link plate 1 for a normal plate link chain, while FIG. 2 shows a link plate 1' for a toothed chain in accordance with a second embodiment.

Independent of the particular configuration of the link plates 1, 1', the chain proposed in accordance with the invention includes a plurality of chain links hingedly connected with each other. Each chain link has link plates 1, 1' that are situated approximately parallel to each other, there being only one link plate 1, 1' shown in the figures, by way of example.

The first embodiment of the chain in accordance with the invention shown in FIG. 1 is a link plate 1 having an elongated shape and rounded ends. In the region of the ends of link plate 1 two openings 2, 3 are provided, situated mirror-symmetrically on the link plates 1, 1', each opening having an approximately circular cross section. Openings 2, 3 are each provided to receive a chain pin or chain sleeve (not shown), depending upon the design of the chain, in order to achieve a hinged connection between adjacent links of the chain. In this embodiment, web regions 4, 5 are provided between the outer edge sections of the link plate ends and the respective associated adjacent openings 2, 3. At each end of elongated link plate 1, approximately semicircular web regions 4, 5 are provided.

As shown in FIG. 2, web regions 6, 7 and 10, 11 are similarly provided in the second embodiment of link plate 1' for a toothed chain. The web regions 6, 7 are provided between each outer flank 8, 8' on a long side of link plate 1' and the respective associated adjacent opening 2, 3. The other web regions 10, 11, on the other hand, are provided between each inner flank 9, 9' on that long side of link plate 1' and the respective associated adjacent opening 2, 3. The outer flanks 8, 8' and inner flanks 9, 9' form teeth, which enable the toothed chain to mesh with intermediate spaces between corresponding teeth of corresponding sprocket wheels around which the toothed chain runs.

Figure 3:
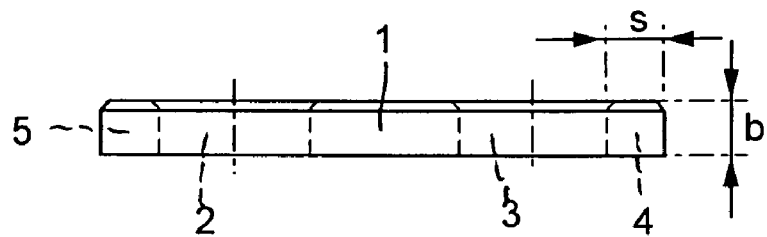
FIG. 3 is a view of the upper edge surface of a chain link plate in accordance with the invention.

As can be seen in particular in FIG. 3, independent of the particular configuration of the link plates 1, 1', the width "s" of each web region 4, 5; 6, 7; 10, 11 is selected so that it is less than the material thickness "b" of the link plates 1, 1' of the chain in accordance with the invention. In accordance with the invention, the width "s" of the material at web regions 4, 5; 6, 7; 10, 11 is less than approximately 0.8 times the material thickness "b" of the link plates 1, 1' of the proposed chain. The indicated width "s" of the web regions 4, 5; 6, 7; 10, 11 is shown in FIGS. 1 and 2 for web regions 4 and 6, and serve as examples for the widths of the other web regions 5; 7; 10, 11.

Although particular embodiments of the present invention have been illustrated and described, it will be apparent to those skilled in the art that various changes and modifications can be made without departing from the spirit of the present invention. It is therefore intended to encompass within the appended claims all such changes and modifications that fall within the scope of the present invention.

What is claimed is:

1. A link plate for a plate-link chain that is composed of a plurality of chain links that include link plates, wherein adjacent chain links are hingedly connected with each other by connectors received in openings of the link plates, said link plate comprising: a plate member having a predetermined thickness and a pair of spaced openings; web regions defined between an outer edge section of the plate and an adjacent plate opening; wherein the web regions have a width that is less than about 0.8 times the predetermined thickness of the plate member.

2. A link plate in accordance with claim 1, wherein the link plate is of elongated form and has rounded ends, and a plate opening is provided at each rounded end, wherein the web regions are provided between the rounded ends and respective adjacent plate openings.

3. A link plate in accordance with claim 2, wherein the web region at each rounded end of the elongated link is of substantially semicircular form.

4. A link plate in accordance with claim 1, wherein the link plate includes spaced teeth for incorporation of the link plate into a toothed chain, and wherein the web regions include regions between outer flanks of the teeth and a respective adjacent plate opening.

5. A link plate in accordance with claim 4, wherein the web regions include regions between inner flanks of the teeth and a respective adjacent plate opening.

6. A link plate in accordance with claim 1, wherein the link plate includes spaced teeth for incorporation of the link plate into a toothed chain, wherein the web regions include regions between inner flanks of the teeth and a respective adjacent plate opening.

* * * * *